United States Patent
Petschnigg (10) Patent No.: US 7,590,344 B2
(45) Date of Patent: Sep. 15, 2009

(54) ADAPTIVE PROCESSING FOR IMAGES CAPTURED WITH FLASH

(75) Inventor: Georg Petschnigg, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 476 days.

(21) Appl. No.: 11/463,873

(22) Filed: Aug. 10, 2006

(65) Prior Publication Data
US 2007/0201853 A1 Aug. 30, 2007

Related U.S. Application Data

(60) Provisional application No. 60/743,378, filed on Feb. 28, 2006.

(51) Int. Cl.
G03B 15/03 (2006.01)
G06K 9/40 (2006.01)

(52) U.S. Cl. .................... 396/155; 382/275

(58) Field of Classification Search .......... 396/155, 396/158, 176, 179, 190; 382/162, 254, 274, 382/275; 348/223.1, 224.1, 239, 370, 371
See application file for complete search history.

(56) References Cited

U.S. PATENT DOCUMENTS

| 7,082,211 | B2 * | 7/2006 | Simon et al. .................. 382/118 |
| 2004/0145674 | A1 * | 7/2004 | Hoppe et al. ................ 348/371 |
| 2006/0008171 | A1 | 1/2006 | Petschnigg et al. | |

FOREIGN PATENT DOCUMENTS

JP 2005-102116 * 4/2005

OTHER PUBLICATIONS

U.S. Appl. No. 10/353,368, filed Jan. 28, 2003, Hoppe, et al.
Agrawal, Raskar, Nayar, Li. *Removing Photography Artifacts Using Gradient Projection and Flash-Exposure Sampling*, pp. 828-835, ACM, 2005.
Hoppe, H., Toyama, K., *Microsoft Technical Report MSR-TR-2003-63 "Continuous Flash"*, pp. 1-7, Oct. 2003.
Petschnigg, Agrawala, Hoppe, Szeliski, Cohen, Toyama. *Digital Photography with Flash and No-Flash Image Pairs*. pp. 664-672. ACM, 2004.

* cited by examiner

Primary Examiner—Kenneth J Whittington
(74) Attorney, Agent, or Firm—Lyon & Harr, LLP; Katrina A. Lyon (57) ABSTRACT

An adaptive fill-flash technique for digital photography that employs flash and no-flash image pairs. A flash image, captured using a flash of known characteristics and ambient light, and an ambient light image, which is taken with only ambient light, of the same image subject matter are acquired. A flash only image, computed by subtracting the known ambient light image from the flash and ambient light image, is computed. The flash only image and the ambient light image are then each white balanced to the flash light and the ambient light, respectively, to form two white-balanced images. These two white-balanced images are then added to form a white balanced image, I, in which the flash and ambient light color agree. It is also possible to reduce the hot spots in image I, and adjust flash strength.

18 Claims, 8 Drawing Sheets

ADAPTIVE PROCESSING FOR IMAGES CAPTURED WITH FLASH

This application claims priority under 35 U.S.C. Section 119(e)(1) of provisional application No. 60/743,378, filed Feb. 28, 2006 and entitled "Adaptive Processing for Images Captured with Flash".

BACKGROUND

In outdoor photography, the sun at noon will typically come straight from above, causing a face to self-shadow which results in unflattering dark rings under eyes and the neck. If the sun comes from behind the subject, the subject may appear too dark in comparison to the bright background. A common solution to this problem is to use a flash to brighten shadows in a face, or to bring foreground and background to similar brightness. This kind of flash is called a fill-flash as it fills in dark areas of an image with extra light.

Fill-flash, however, has a few shortcomings. Finding the right amount of flash to use, so that the foreground receives just enough light to match the background, is difficult. Too much light causes the foreground to be overexposed (for example, the face becomes too bright), whereas too little flash renders the technique useless and causes details in the darkened areas to be lost. Furthermore, it is hard to estimate the right flash intensity to use as different skin colors reflect more or less light. Similarly, oily patches of skin or flat surfaces such as the forehead cause hotspots which can emphasize sweaty or oily skin and wrinkles.

Another problem with using fill-flash is that the color of the flash and the color of the ambient light often do not agree. Photographers measure light color in terms of a warm or cool temperature expressed in Kelvin (K). For example, indoor lighting is very warm or red in nature (2800 K) compared to a cool flash (5500 K) or outdoor sun (9000+ K). As a result, the color of a subject lit by flash in certain indoor situations looks unnatural. Professional photographers add colored filters to their flash to offset this effect. However, this requires them to carry around a collection of color filters. Additionally, determining the proper filter and using it is often too difficult for the novice photographer.

SUMMARY

The present adaptive fill-flash technique describes a photo acquisition and manipulation technique for digital photography. The adaptive fill-flash technique improves the look and simplifies the use of fill-flash photography, in particular in the case of, but not limited to, portrait photography.

The adaptive fill-flash technique is a technique for digital photography that employs flash and no-flash image pairs. In one exemplary embodiment, a fill-flash image, which is captured using a flash of known characteristics, and an ambient light image, which is taken without flash, are captured for the same image subject matter. Preferably these two images are acquired within a short time interval so that there is minimum motion of the camera and the subject matter of the image. A difference image, a fill-flash only image, is then computed by extracting the known ambient light from the flash image. The fill-flash only difference image and the ambient light image are then each white balanced to form two white-balanced images. These two white-balanced images are then combined to form a white balanced image, I, in which the flash and ambient color agree.

It is also possible to reduce the hot spots in image I. In one embodiment, this is done by replacing its mid-frequency with that of the white-balanced ambient image. Additionally, the fill-flash strength can then be adjusted by blending I and the white-balanced ambient image.

It is noted that while the foregoing limitations in existing techniques for overcoming flash photography issues described in the Background section can be resolved by a particular implementation of the adaptive fill-flash technique described, this technique is in no way limited to implementations that just solve any or all of the noted disadvantages. Rather, the present technique has a much wider application as will become evident from the descriptions to follow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The specific features, aspects, and advantages of the claimed subject matter will become better understood with regard to the following description, appended claims, and accompanying drawings where:

DETAILED DESCRIPTION

In the following description, reference is made to the accompanying drawings that form a part hereof, and in which is shown by way of illustration specific embodiments in which the invention may be practiced. It is understood that other embodiments may be utilized and structural changes may be made without departing from the scope of the present disclosure.

2.0 Adaptive Fill-Flash Technique.

The present adaptive fill-flash technique describes a photo acquisition and manipulation technique for digital photography. The adaptive fill-flash technique improves the look and simplifies the use of fill-flash photography, in particular in the case of, but not limited to, portrait photography.

The adaptive fill-flash technique is a technique for digital photography that employs flash and no-flash image pairs. This image pair provides a few interesting properties. First, the flash will separate the image into foreground and background, because the flash power falls off with the square of the distance. Hence only nearby objects receive flash light. Second, the flash color is known and provides a reference point for estimating scene illuminants. Third, the flash adds more light which leads to a cleaner image signal. Lastly, the image pair provides a photographer with choice as to which image to use.

2.1 Exemplary Adaptive Fill-Flash System and Operating Environment.

Figure 1:
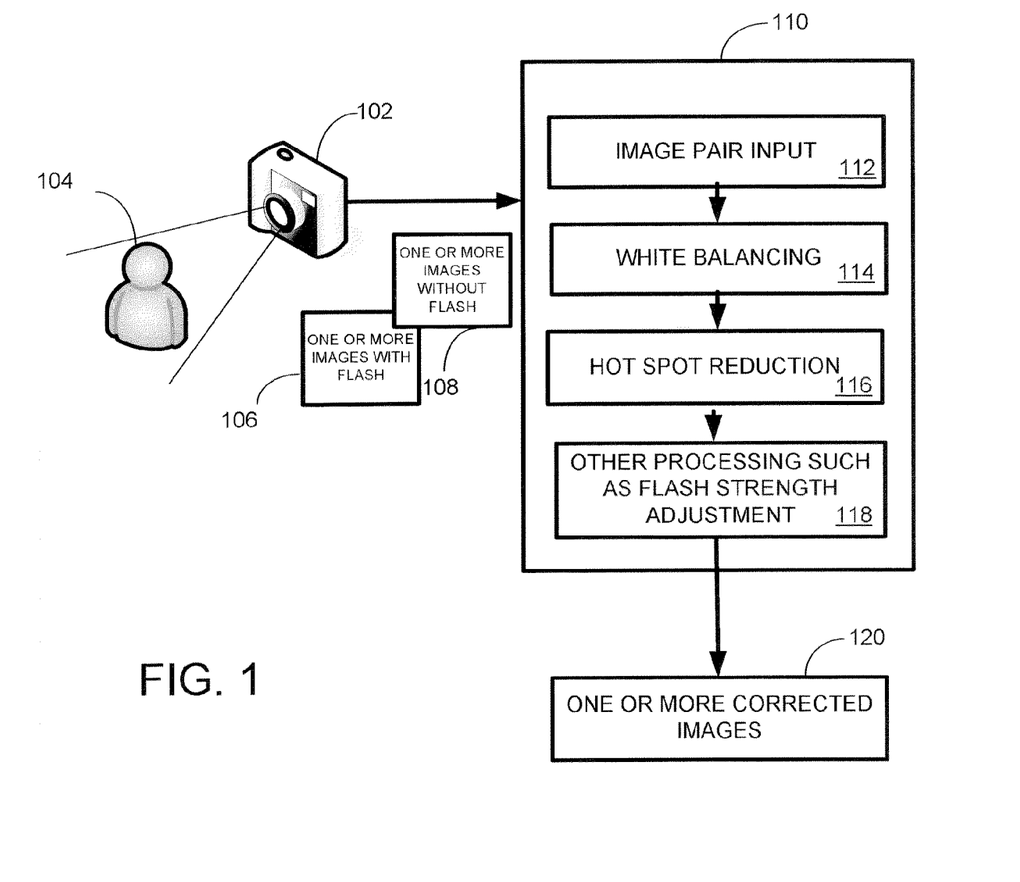
FIG. 1 is an exemplary block diagram depicting one embodiment of the present adaptive fill-flash technique operating in an exemplary operating environment.

A high level exemplary block diagram of an exemplary adaptive fill-flash system and overall operating environment is shown in FIG. 1. As shown in FIG. 1, the adaptive fill-flash technique in this embodiment includes a camera 102, that captures images of a subject 104, such as, for example, a person. One or more image pairs are captured, one image of each pair being captured with flash 106 and the other being captured without flash 108. These images are input into a computing device 110 that performs the adaptive fill-flash processing and outputs a corrected image 120. The computing device may run program modules including an image pair input module 112, a white balancing module 114, a hot spot reduction module 116 and other processing modules such as a flash strength adjustment module 118.

2.2 Adaptive Fill-Flash Technique/Overview.

In general, the adaptive fill-flash technique uses images captured with different lighting conditions. In one exemplary implementation, multiple images of the same scene but with different lighting conditions are acquired. For example, two images may be captured for the same subject. The first image may be captured with ambient lighting (where ambient lighting is typically generated by a light source that remains constant during the capture process, or may also be no light at all) and the second image may be captured with the addition of a known light source, such as a flash. The contribution of the illuminant by the known light source in the second image is extracted to form a third image. For example, the third image may be extracted by subtracting the first image from the second image. Separate processing steps are performed on the extracted image and the first image. For example, the extracted image may be white-balanced for the color of the known light source and the first image may be white-balanced for an estimated color of the ambient light. The processed images are then combined to form the final image. Other corrective processing may also take place.

Figure 2:
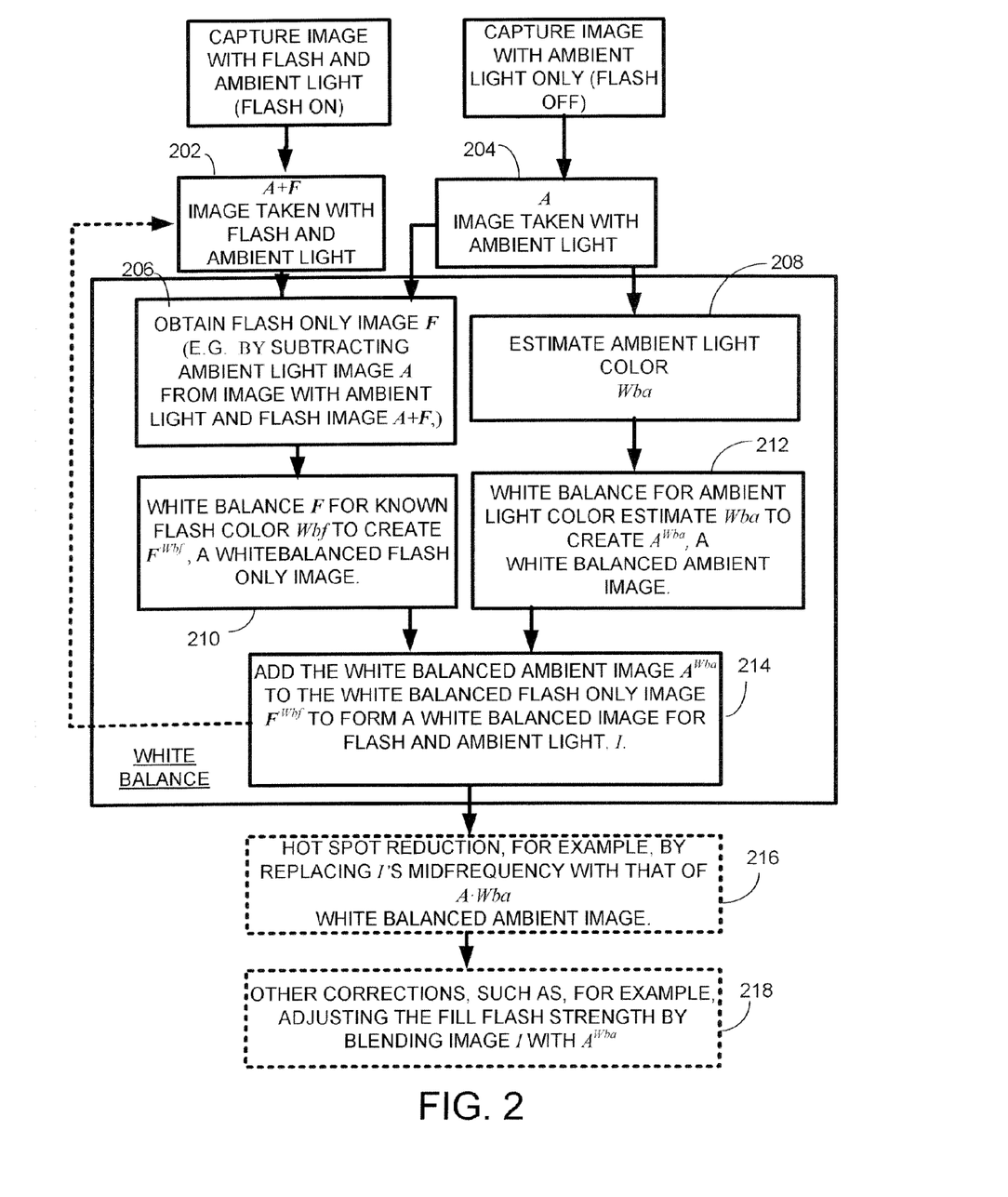
FIG. 2 is a block diagram depicting one embodiment of the adaptive fill-flash technique described herein.

More specifically, one embodiment of the adaptive fill-flash technique described herein is shown in FIG. 2. As shown in process actions 202, 204, a fill-flash image, F+A, acquired using a flash of known characteristics and ambient light, and an ambient light only image, A, of the same image subject matter are acquired. Images F+A and A are preferably captured within a short time interval so that there is little motion of the camera and the subject matter of the image between images of the set. A fill-flash only image, F, which is a difference image computed by subtracting image A from image F+A, is computed, as shown in process action 206. The ambient light color $W_{ba}$ is estimated from the ambient light image A using conventional methods (process action 208). Image F and the ambient light image, A, are then white balanced, as is shown in process actions 210, and 212, to form images $F^{wb}$ and $A^{wb}$, where $F^{wb}$ is the white-balanced fill-flash only difference image, and $A^{wb}$ is the white-balanced ambient light image. In a preferred implementation, $F^{wb}$ can be used as a surface color estimate for the white-balancing process for image $A^{wb}$. For example, a large white surface in the image $F^{wb}$ should still appear white in the image $A^{wb}$. Images $F^{wb}$ and $A^{wb}$ are then combined to form a white balanced image I in which the color of flash and ambient illuminant agree (process action 214). It is also optionally possible to reduce the hot spots, as shown in process action 216. In one embodiment, this is done by replacing its mid-frequency with that in $A^{wb}$, by a process to be described later. Additionally, the fill-flash strength can also optionally be adjusted by blending I and $A^{wb}$ (as shown in process action 218), which will also be discussed in greater detail below. It should be noted that the above process can be performed for multiple images taken with flash (as indicated by the dotted line from process action 214 to 202) to generate multiple white balanced images in which the color of the flash and ambient light agree. Subsequent processing can also be performed on these images.

Although the present examples are described and illustrated herein as being implemented in a system for white-balancing an image using separate processing for a flash and ambient image pair, the technique described is provided as an example and not a limitation. As those skilled in the art will appreciate, the present examples are suitable for application in a variety of different types of systems for image enhancement by separately processing multiple images captured under different lighting conditions.

Additionally, it should be noted that the order in which the fill-flash image and the ambient light image are captured is not important. The previously described process is shown here for illustration. In actual implementation, more, less, or different process actions may be implemented. For instance, it is not necessary to correct the image I for hot spots, or to adjust the fill-flash strength by blending. Any and all of these process actions can be performed as stand alone image enhancements or can be combined into different hybrid embodiments.

The following sections provide additional details and variations of the adaptive fill-flash technique described above.

2.3 Image Acquisition.

As discussed above, the adaptive fill-flash technique acquires and stores an image set, typically composed of two images, with a camera. Typically, these images will depict the same static scene. One picture is taken without flash and the other picture is taken with a flash. These pictures in the image set ideally should be acquired in a short time interval, so that there is a minimum of motion of the camera and the subject matter of the image. However, if there is significant misalignment between the initially acquired images they can be aligned using conventional image alignment methods.

While the acquisition of a fill-flash, F+A, and ambient light image, A, pair is performed by a camera, the processing of the image pair can occur on the imaging device (camera, video, etc.) or other computation devices such as, for example, a desktop PC. In one embodiment a camera acquires the image pair and the processing occurs on a PC. However, other embodiments exist were processing occurs on a camera, cellphone cameras or flash assisted video cameras, for example.

Figure 3:
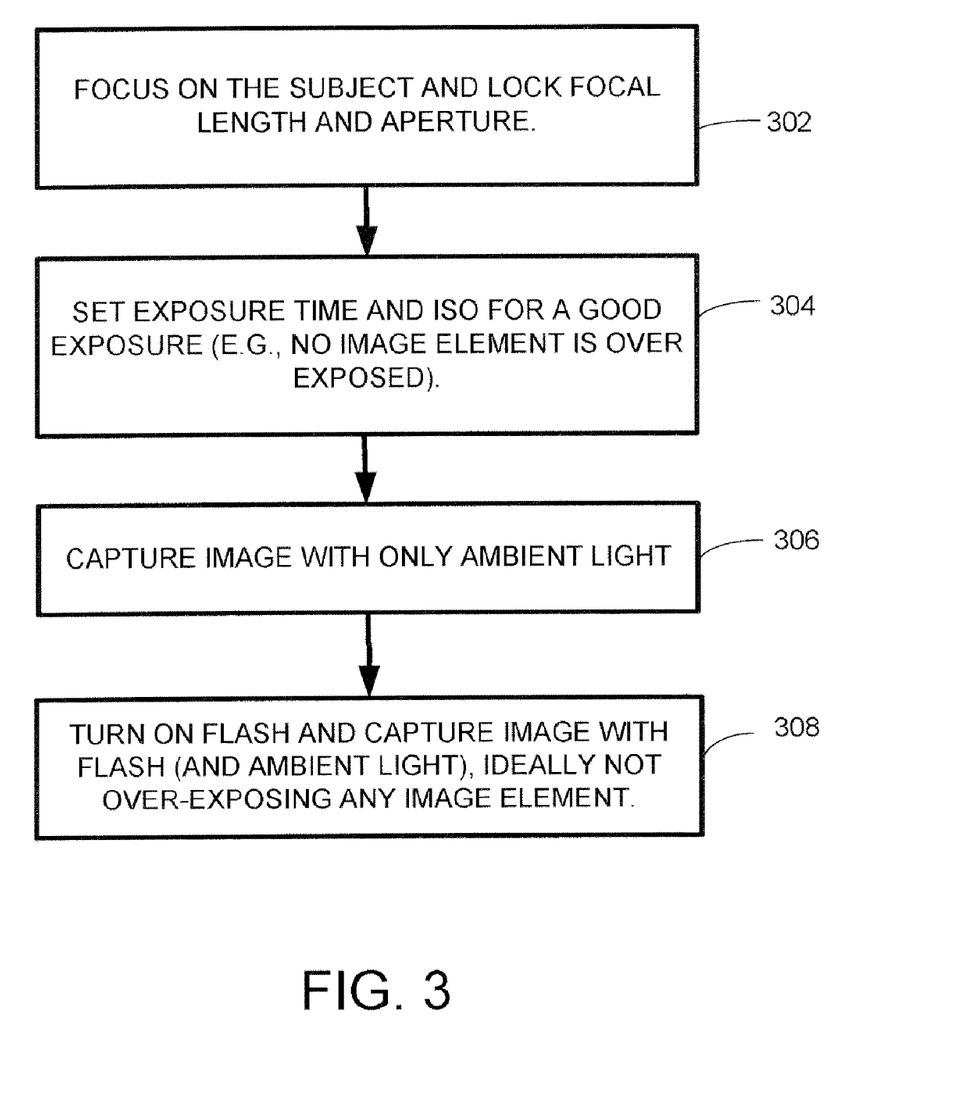
FIG. 3 is an exemplary flow diagram of acquiring image pairs in one embodiment of the present adaptive fill-flash technique.

More specifically, as shown in FIG. 3, in one embodiment, the acquisition steps for the image pair is as follows. Initially, in order to acquire the non-flash or ambient image, the camera is focused on the subject, and then the focal length and aperture are locked, as shown in process action 302. The exposure time and ISO sensitivity are also set for a good exposure (process action 304). Ideally, no image element should be overexposed. The ambient light image, A, is captured (process action 306). Then the flash is turned on and the flash image, F+A, is taken (process action 308), ideally not overexposing any imaging element. In taking the flash image, the flash is preferably set to a conservative low energy amount thereby avoiding overexposing the image. In one working embodiment of the adaptive fill-flash technique this is accomplished by using a Through-the-Lens (TTL) metered type of flash, or by acquiring multiple flash images while reducing the flash power until no pixel is overexposed.

Finally there should be sufficient ambient light available to ensure fairly low-noise images. While this is not a strict requirement, it enhances the look of the correct image that is output noticeably.

2.4 Bronzing Lighting Variation.

In another exemplary embodiment of the present adaptive fill-flash technique, instead of correcting the flash color to white, a colored tone can be intentionally added to the flash light. For example, a bronze tone can be added to a model's skin color to create a warm white tone. This is similar to the effect of using golden reflective foil, often used by professional photographers, without the trouble of carrying additional equipment along.

Figure 4:
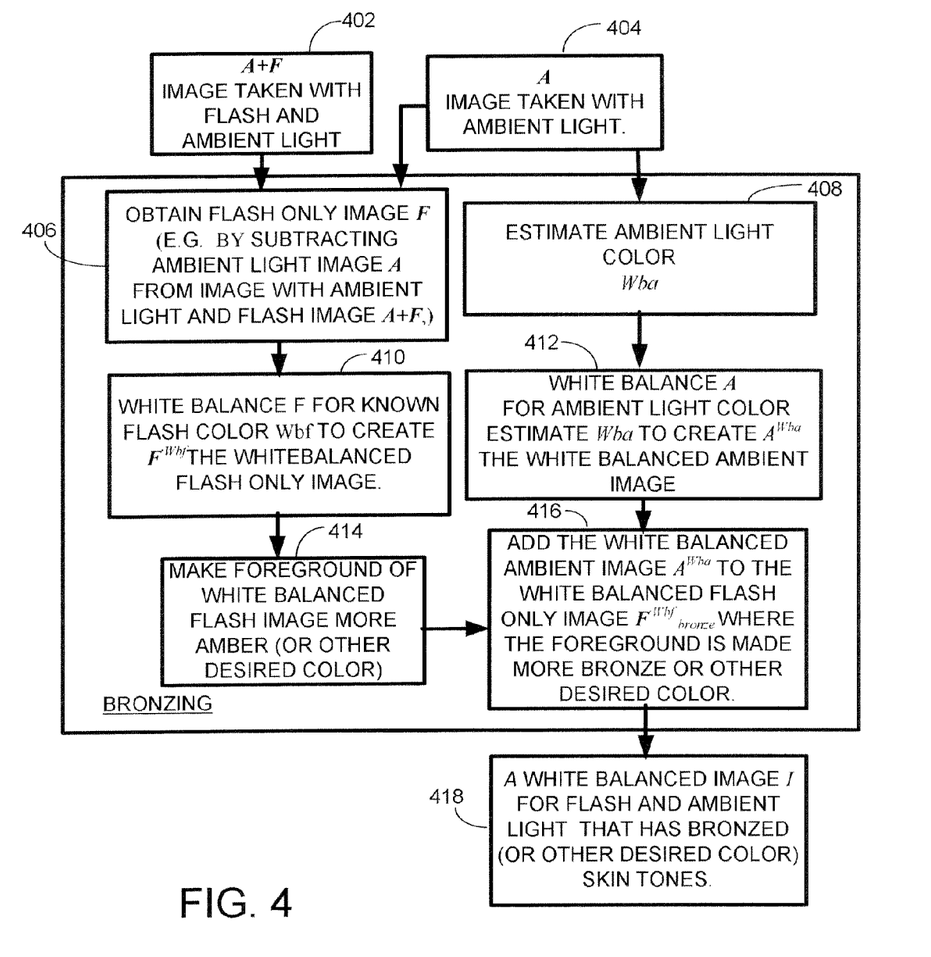
FIG. 4 is an exemplary flow diagram of one embodiment of the present adaptive fill-flash technique wherein foreground images are bronzed or rendered in some other specified color.

More specifically, one exemplary embodiment of the adaptive fill-flash technique described herein, wherein a bronzing or tanning effect (or other desired color) is accomplished, is shown in FIG. 4. As shown in process actions 402, 404, a fill-flash image, F+A, acquired using a flash of known characteristics and ambient light, and an ambient light only image, A, of the same image subject matter are acquired, preferably captured within a short time interval. A fill-flash only image, F, which is a difference image computed by extracting image A from image F+A is computed, as shown in process action 406. The ambient light color $W_{ba}$ is estimated from the ambient light image A (process action 408). Image F and the ambient light image, A, are then white balanced, as is shown in process actions 410, and 412, to form images $F^{wb}$ and $A^{wb}$, where $F^{wb}$ is the white-balanced fill-flash only difference image, and $A^{wb}$ is the white-balanced ambient light image. The foreground of image $F^{wb}$ is then white-balanced to make it more amber (or other specified color), resulting in image $F^{wb}_{bronze}$. Images $F^{wb}_{bronze}$ and $A^{wb}$ are then added to form a white balanced image I in which foreground objects are more bronze or other specified color (process actions 416, 418).

Additionally, it should be noted that the ambient image A could be adjusted using the same techniques. For example, rather than correcting image A to a white tone, the image could be colored in such a way to create a pronounced color contrast between the areas exposed by flash an those without.

While this embodiment describes the application of adaptive white-balancing to the images A and F respectively, other operations such as sharpening, blurring, adjustments to color saturation or contrast could be made as well. That is, one could apply any image editing operation to the regions carved out by the flash. For example, just like color-balancing the flash only area separately, the background could be blurred for a depth-of-field effect or the background could be desaturated to emphasize the foreground via conventional methods.

2.5 Slow Sync Flash/Night Shot Mode Variation.

Many digital cameras come with a night shot mode, also referred to as slow sync flash. Slow sync flash is useful in dark indoor environments such as evening soirées, art-openings or bars. In this mode, an image is taken with flash and the shutter is then kept open to expose for the background. As a result part of the image is exposed by flash, tinting that area blue, while other parts are lit by the ambient illumination, which tints those areas orange or other tones. A traditional approach is to correct for an average color tint, but this means part of the scene will be either too blue or orange.

As discussed previously, the adaptive fill-flash technique described herein allows for adaptive white balancing by using two images: one with the flash, the other without. After each image has been corrected for flash and ambient light respectively, they can be added to create an image that has the correct colors for a night setting.

Figure 5:
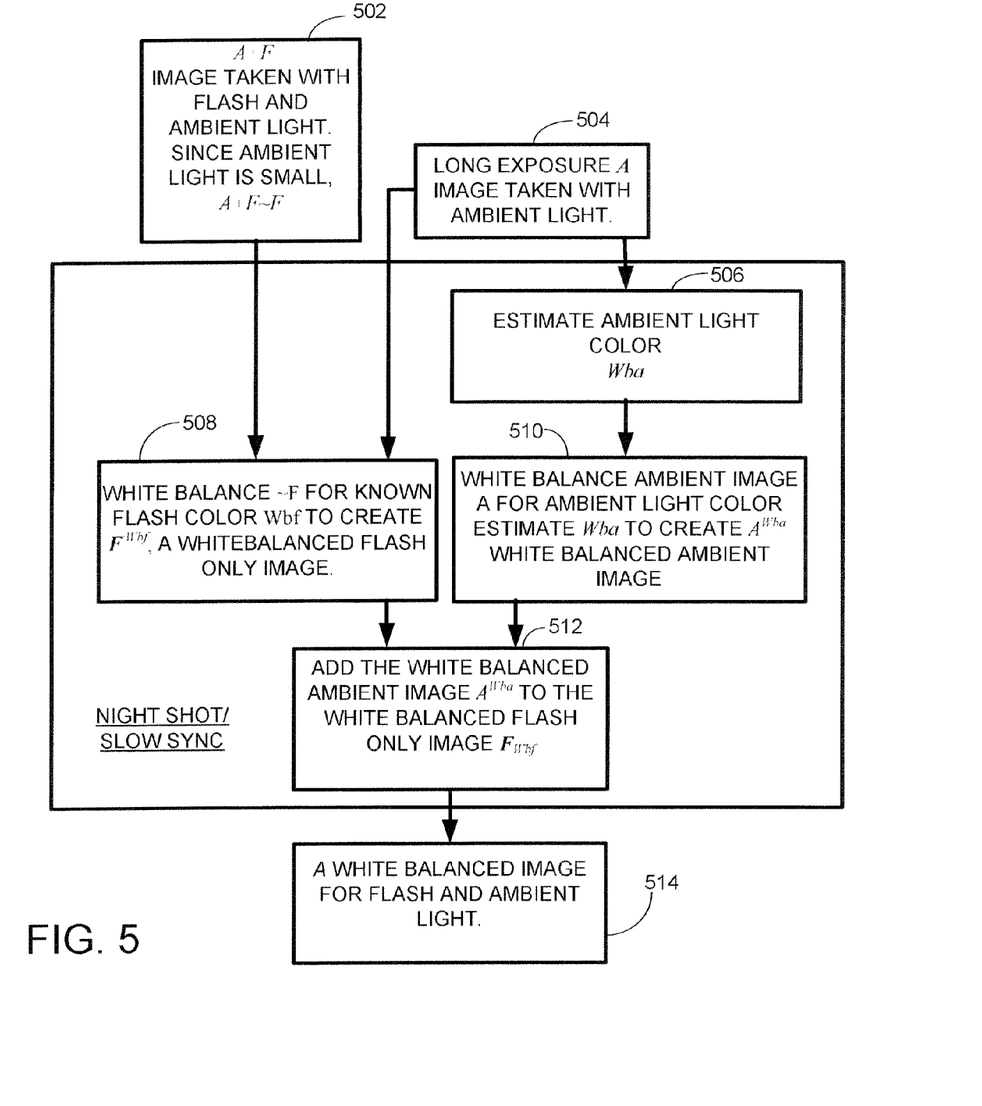
FIG. 5 is an exemplary flow diagram of one embodiment of the present adaptive fill-flash technique wherein images taken in night shot or slow sync mode are corrected.

More specifically, one embodiment of the adaptive fill-flash technique for a slow sync or night shot image acquisition mode is shown in FIG. 5. As shown in process action 502, a fill-flash image, F+A, is acquired using a flash of known characteristics and ambient light. Since there is little ambient light, the fill-flash image, F+A, generally approximates a flash only image, F. An ambient light only image, A, of the same image subject matter is also acquired. The ambient image, A, is acquired taking a long exposure (process action 504). The ambient light color $W_{ba}$ is estimated from the ambient light image A (process action 506). Image F and the ambient light image, A, the one that is taken with ambient light only, are then white balanced, as is shown in process actions 508 and 510, to form images $F^{wb}$ and $A^{wb}$, where $F^{wb}$ is the white-balanced fill-flash only difference image, and $A^{wb}$ is the white-balanced ambient light image. Images $F^{wb}$ and $A^{wb}$ are then added (process action 512) to form a white balanced image I in which flash and ambient color agree (process action 514).

2.6 Hot Spot Reduction.

Hot spots are areas illuminated by flash that appear too bright. They occur in the image, because the flash is a very bright focused light source and certain areas, such as the oily unflattering T-zone in the face, reflect more light than the surrounding areas of the face. As a result typical portraits of a person's face in fill-flash photography suffer from hot spots.

Images can be expressed in the frequency domain, as is known to those with ordinary skill in the art. The frequency domain is a space in which each image value at image position P represents the amount that the intensity values in image I vary over a specific distance related to P. In the frequency domain, changes in image position P correspond to changes in the spatial frequency, or the rate at which image intensity values are changing in the spatial domain image. In many cases, the Fourier transform is used to convert images from the spatial domain into the frequency domain and vice-versa. A related term used in this context is spatial frequency, which refers to the inverse of the periodicity with which the image intensity values change. Image features with high spatial frequency (such as edges) are those that change greatly in intensity over short image distances.

Typically hot spots will be fairly large and uniform across the face. In signal processing terms, the hot spots can be expressed as the mid-frequency band of the image. In one embodiment, the present adaptive fill-flash technique replaces the mid-frequency band from of image I with the mid-frequency band of the white balance corrected ambient image $A^{wb}$. The replacement of the mid-frequency band can be constrained to the area affected by the flash only, which is captured by F, the flash only image. The mid-frequency band can be found through a band-pass filter that is of the approximate width of the hot spot. Automatic estimation of the hot spot areas can be performed using face recognition techniques that are well known in the art. With user interaction a user could specify the size of the face by drawing a bounding rectangle around it. In one exemplary implementation the band-pass is a bi-lateral filter, with the domain size set to about half a face (for example, plus or minus 10%) and the range large enough to cover the color change caused by the flash. Domain denotes the width in the spatial domain (or frequency), and range the level of color to be affected. The resulting image after white-balancing and hot spot correction is called I* for purposes of this description.

Figure 6:
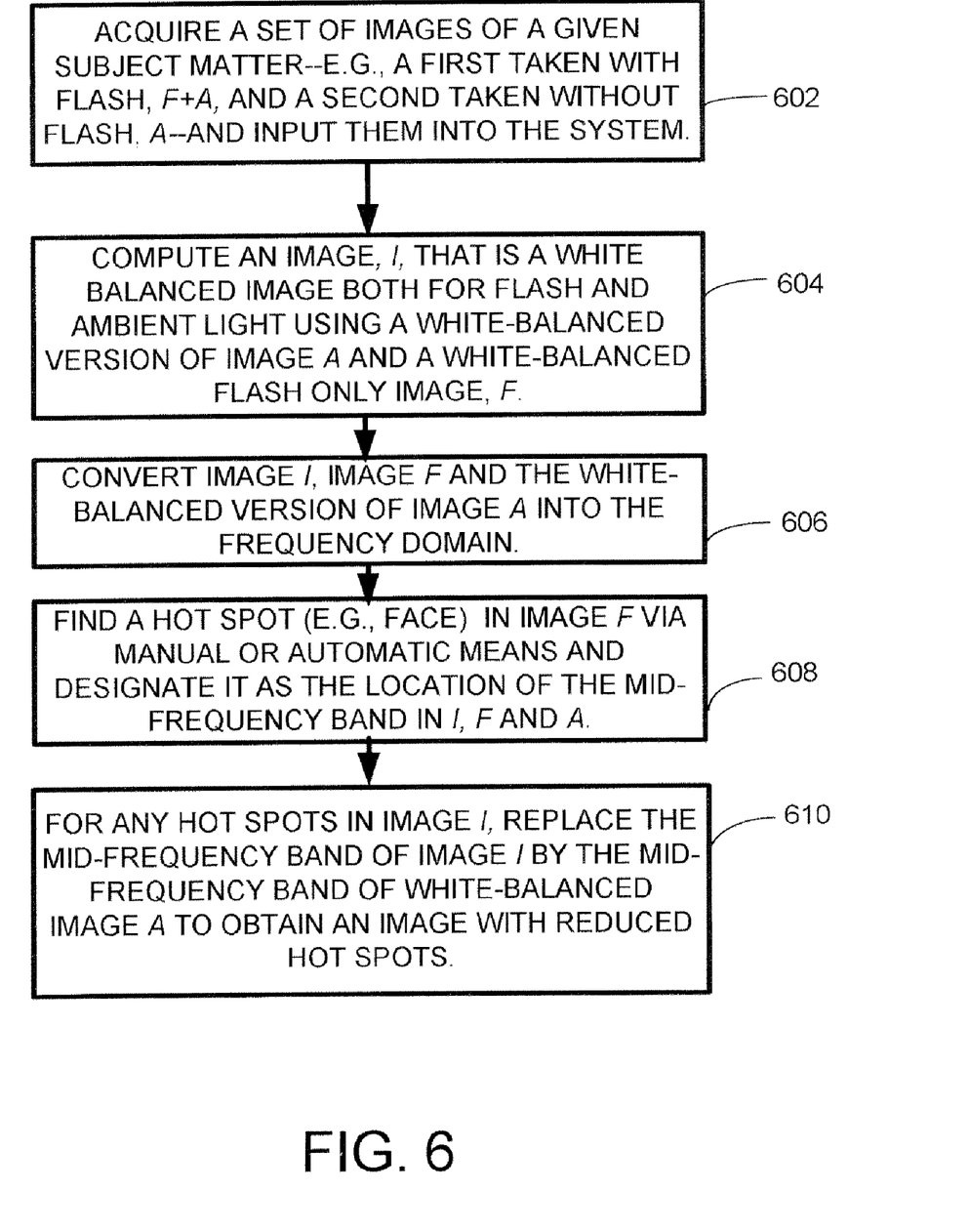
FIG. 6 is an exemplary flow diagram of one embodiment of the present adaptive fill-flash technique wherein hot spots in images are corrected.

More specifically, an exemplary embodiment of hot spot reduction using the adaptive fill-flash technique is shown in FIG. 6. As shown in process action 602, a pair of images, one with flash, F+A, and one without flash, A, are acquired and input into the system. An image, I, is computed that is white-balanced for both flash and ambient light using the white-balanced version of image A, and a white-balanced version of a flash-only image, F, in the same manner as was discussed with respect to FIG. 2, as shown in process action 604. Image I, corresponding image F and the white-balanced version of image A, are converted from the image domain into the frequency domain, as shown in process action 606. Image F is searched to find any hot spots, such as would be found on faces. This can be done by using a band pass filter that is the approximate width of the hot spot or be estimated by using manual or automatic face detection methods which are well known in the art. Any hot spots, such as, for example, any detected faces in image F, are designated as the location of the mid-frequency band (e.g., a hot spot) (process action 608). The portion of the mid-frequency band of image I that corresponds to the mid-frequency band in image F is replaced by the mid-frequency band of white-balanced image A to obtain an image with reduced hot spots, I* (process action 610).

2.7 Continuous Fill-Flash/Fill-Flash Strength Adjustment.

Image I* represents the fill-flash image that is properly white-balanced and has reduced hot spots, $A^{wb}$ is the white-balanced ambient light image. These two images can be blended, for example, by using a technique described by Hoppe in 2004. The Hoppe system and method, named the continuous flash system and method, facilitates user-selectable illumination of a photograph or other image ranging from full artificial flash illumination to ambient light illumination and every gradation between, based on a set of initially acquired images of identical or similar subject matter. Additionally, it is even possible to extrapolate beyond the initially acquired images to achieve other illumination effects.

The improvement to the Hoppe continuous flash technique provided by the adaptive fill-flash technique is that the input images are correctly white-balanced and hot-spots are corrected for in order to improve the appearance of the flash adjusted image output by the Hoppe continuous flash technique. In Hoppe, the images white-points may not have been aligned causing unnatural colorations when extrapolating between the images.

Figure 7:
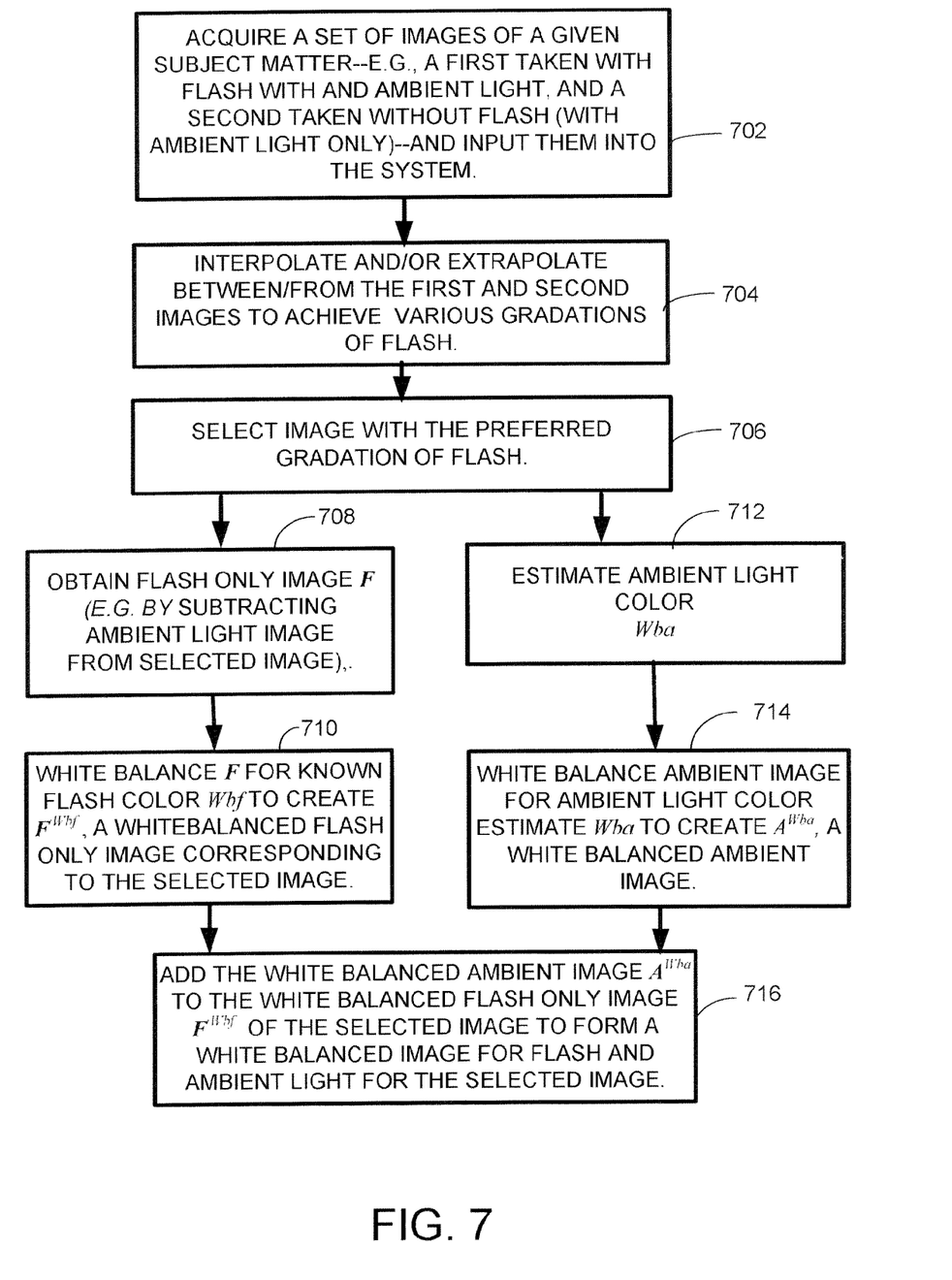
FIG. 7 is an exemplary flow diagram of one embodiment of the present adaptive fill-flash technique wherein fill-flash strength is corrected by interpolation or extrapolation.

More specifically, one embodiment of the adaptive fill-flash technique that is an improvement to the continuous flash system and method is shown in FIG. 7. The adaptive fill-flash technique acquires and stores an image set, typically composed of two images, with a camera (process action 702). Typically, these images will depict the same static scene. One picture is taken without flash and the other picture is taken with a flash. It should be noted that if the originally acquired image set includes more than one image with flash (while still retaining the image taken at ambient light conditions) better interpolation/extrapolation results can be obtained. These pictures in the image set ideally should be acquired in a short time interval, so that there is little motion of the camera and the subject matter of the image between the images of the set. Once the initial set of images is acquired, and optionally aligned, the system interpolates and/or extrapolates the amount of flash, as shown in process action 704, 706. In such a case, additional images are generated. Essentially, in the case of interpolation, image processing is employed to interpolate the flash intensity between input images to generate an image or images having flash intensity value(s) in-between those of the input image set. Whereas, in the case of extrapolation, extrapolation techniques are used to extrapolate the flash intensity to generate images having a flash intensity outside those of the input image set. The resulting images are referred to as flash adjusted images. One or more of these flash adjusted images can be selected as the desired image, the image with the preferred amount of flash, as shown in process action 706. The selected flash-adjusted image can also be white-balanced as was discussed with respect to FIG. 2. To this end, the ambient light image is subtracted from the selected image in order to obtain a flash only image, F, as shown in process action 708. Image F is white-balanced for the known flash color to create $F^{Wbf}$, a white-balanced flash only image corresponding to the selected image (process action 710). The ambient light color is estimated from the ambient light image and is used to white-balance the ambient light image, (process actions 712, 714) in a manner similar to that discussed with respect to FIG. 2. Finally, the white-balanced flash only image and the white-balanced ambient image are combined to create a version of the selected image that is white-balanced for flash and ambient light (process action 716). Other variations, such as reducing hot spots and applying the bronzing effect, are also possible.

3.0 The Computing Device/Environment.

The technique is operational with numerous general purpose or special purpose computing system environments or configurations. Examples of well known computing systems, environments, and/or configurations that may be suitable for use with the process include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 8:
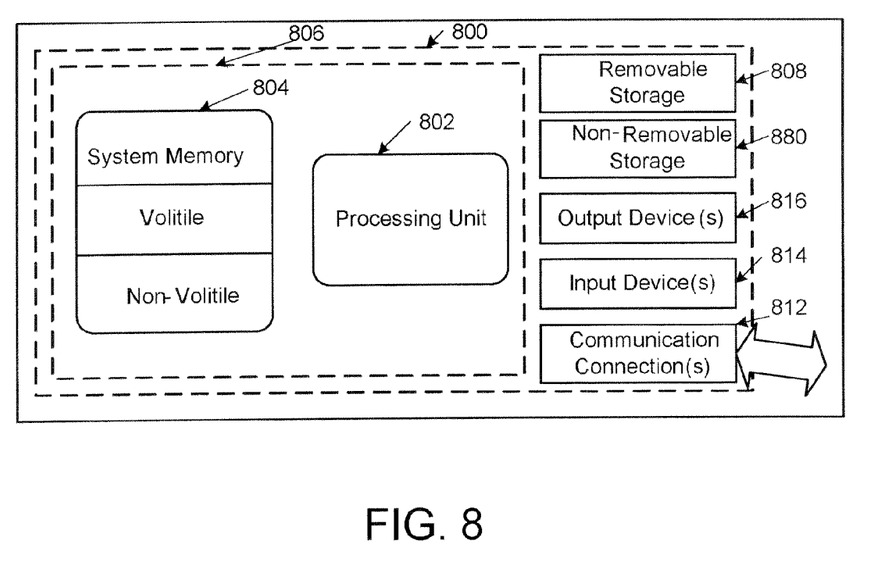
FIG. 8 is a diagram depicting a general purpose computing device constituting an exemplary system for implementing the present adaptive fill-flash technique.

FIG. 8 illustrates an example of a suitable computing system environment. The computing system environment is only one example of a suitable computing environment and is not intended to suggest any limitation as to the scope of use or functionality of the present system and process. Neither should the computing environment be interpreted as having any dependency or requirement relating to any one or combination of components illustrated in the exemplary operating environment. With reference to FIG. 8, an exemplary system for implementing the present process includes a computing device, such as computing device 800. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 8 by removable storage 108 and non-removable storage 810. Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. Any such computer storage media may be part of device 800.

Device 800 may also contain communications connection(s) 812 that allow the device to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 800 may also have input device(s) 814 such as keyboard, mouse, camera, microphone, pen, voice input device, touch input device, etc. In particular, one such input device is a camera. Output device(s) 816 such as a display, speakers, printer, etc. may also be included. All these devices are well know in the art and need not be discussed at length here.

The present technique may be described in the general context of computer-executable instructions, such as program modules, being executed by a computing device. Generally, program modules include routines, programs, objects, components, data structures, and so on that perform particular tasks or implement particular abstract data types. The technique may also be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for improving images taken with flash, comprising using a computer to perform the process actions of:
    (a) acquiring a first image captured with flash and ambient light;
    (b) acquiring a second image, corresponding to the first image, captured with ambient light;
    (c) using the first image and the second image to create a third flash-only image;
    (d) estimating the ambient light color from the second image taken with ambient light only;
    (e) white-balancing the second image using the estimated ambient light color to obtain a white-balanced ambient light image;
    (f) white-balancing the third flash-only image to a known flash color to create a white-balanced flash-only image;
    (g) adding the white-balanced ambient light image and the white-balanced flash only image to obtain an image white-balanced for flash and ambient light;
    (h) obtaining additional white-balanced flash-only images; and
    (i) adding the additional white-balanced flash-only images to the white-balanced ambient light image to obtain multiple images white-balanced for flash and ambient light.

2. The computer-implemented process of claim 1 wherein the flash-only image is created by subtracting the second image from the corresponding first image to obtain the third flash-only image.

3. The computer-implemented process of claim 1 wherein the first and second images are acquired by selecting them from a plurality of images taken of the same subject matter.

4. The computer-implemented process of claim 1 further comprising the process actions of:
    reducing hot spots in the image white-balanced for flash and ambient light.

5. The computer-implemented process of claim 1 further comprising the process actions of:
    after white-balancing the third flash-only image to a known flash color to create a white-balanced flash only image, white-balancing the flash only image again for a specified color, before adding the white-balanced ambient light image and the white-balanced flash only image to obtain an image white-balanced for flash and ambient light wherein foreground objects reflect the specified color.

6. The computer-implemented process of claim 1 wherein the ambient light is very little, and wherein the ambient light image is taken with a long exposure, and wherein the flash-only image is obtained by assuming the ambient light is approximately zero.

7. A computer-implemented process for improving images taken with flash, comprising using a computer to perform the process actions of:
    (a) acquiring a first image captured with flash and ambient light;
    (b) acquiring a second image, corresponding to the first image, captured with ambient light;
    (c) using the first image and the second image to create a third flash-only image;
    (d) estimating the ambient light color from the second image taken with ambient light only;
    (e) white-balancing the second image using the estimated ambient light color to obtain a white-balanced ambient light image;
    (f) white-balancing the third flash-only image to a known flash color to create a white-balanced flash-only image;
    (g) adding the white-balanced ambient light image and the white-balanced flash only image to obtain an image white-balanced for flash and ambient light;
    (h) reducing hot spots in the image white-balanced for flash and ambient light comprising the actions of:
    converting the image white-balanced for flash and ambient light into the frequency domain;
    converting the white-balanced ambient light image into the frequency domain;
    converting the flash-only image into the frequency domain;

finding a hot spot in the flash-only image converted into the frequency domain;

for any hot spot found in the flash-only image converted into the frequency domain, designating its location as the location of the mid-frequency band of the image white-balanced for flash and ambient light converted into the frequency domain, and the location of the mid-frequency band of the ambient light image converted into the frequency band; and replacing the mid-frequency band of the image white-balanced for flash and ambient light converted into the frequency domain with the mid-frequency of white-balanced ambient light image converted into the frequency domain.

8. The computer-implemented process of claim 7 wherein hot spots are on faces, and wherein face detection is used in finding the hot spots.

9. The computer-implemented process of claim 8, wherein the face detection used in finding the hot spots is automatic.

10. The computer-implemented process of claim 9 wherein the face detection used in finding the hot spots is manually performed by a user that identifies the location of a face.

11. The computer-implemented process of claim 7 wherein the process action of finding a hot spot comprises using a band-pass filter or bilateral filter.

12. A system for improving the appearance of an image taken with flash, comprising:
   a general purpose computing device;
   a computer program comprising program modules executable by the general purpose computing device, wherein the computing device is directed by the program modules of the computer program to,
   acquire a first image illuminated by ambient lighting;
   acquire a second image corresponding to the first image, the second image illuminated by a known light source in addition to the ambient lighting;
   white-balance the second image for a color associated with the known light source;
   white-balance the second image for a specified color to create a third image white-balanced for a specified color;
   white-balance the first image for a color associated with the ambient light; and
   combine the first and third white-balanced images to form a processed image.

13. The system of claim 12 wherein the computing device is embodied in one of:
   a desk top personal computer;
   a notebook computer;
   a camera;
   a cellular phone;
   a video camera.

14. The system of claim 12 wherein the ambient lighting is very little, and wherein the first image is taken with a long exposure.

15. The system of claim 12 further comprising a module for adjusting the flash strength in the processed image.

16. A method for correcting images taken with flash, comprising:
   (a) acquiring a first image captured with flash and ambient light;
   (b) acquiring a second image, corresponding to the first image, captured with ambient light only;
   (c) interpolating between the first and second images to achieve images representing various gradations of flash;
   (d) selecting an image with the preferred gradation of flash;
   (e) white-balancing the selected image by:
      (1) using the second image and the selected image to obtain a third flash-only image;
      (2) estimating an ambient light color from the second image taken with ambient light only;
      (3) white-balancing the second image using the estimated ambient light color to obtain a white-balanced ambient light image;
      (4) white-balancing the flash-only image for a known flash color to create a white-balanced flash only image;
      (5) white-balancing the white-balanced flash-only image for a desired color-tone to create a color-toned white-balanced flash only image; and
      (6) adding the color-toned white-balanced flash only image and the white-balanced ambient light image to obtain the selected image that is white-balanced for the preferred flash gradation, color tone, and ambient light.

17. The method of claim 16 wherein the ambient light is very little, and wherein the ambient light image is taken with a long exposure, and wherein the flash-only image is obtained by assuming the ambient light is approximately zero.

18. The method of claim 16 further comprising extrapolating from the first and second images to achieve images representing various gradations of flash.

* * * * *